(12) United States Patent
Arar et al.

(10) Patent No.: US 10,318,144 B2
(45) Date of Patent: Jun. 11, 2019

(54) PROVIDING FORCE INPUT TO AN APPLICATION

(71) Applicant: International Business Machines Corporation, Armonk, NY (US)

(72) Inventors: Raphael I. Arar, Santa Cruz, CA (US); Hovey R. Strong, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/439,816

(22) Filed: Feb. 22, 2017

(65) Prior Publication Data

US 2018/0239481 A1      Aug. 23, 2018

(51) Int. Cl.
*G06F 3/0488* (2013.01)

(52) U.S. Cl.
CPC .................. *G06F 3/0488* (2013.01)

(58) Field of Classification Search
CPC .............. G06F 3/0414; G06F 3/0416
See application file for complete search history.

(56) References Cited

U.S. PATENT DOCUMENTS

| 8,885,927 | B2 | 11/2014 | Chen | |
|---|---|---|---|---|
| 2005/0114142 | A1* | 5/2005 | Asukai | A61B 5/16 704/270 |
| 2009/0055484 | A1* | 2/2009 | Vuong | G06Q 10/107 709/206 |
| 2009/0158152 | A1 | 6/2009 | Kodimer et al. | |
| 2010/0011388 | A1* | 1/2010 | Bull | H04N 21/41407 725/9 |
| 2010/0060461 | A1* | 3/2010 | Sprague | A61B 5/16 340/573.1 |
| 2011/0084932 | A1* | 4/2011 | Simmons | G06F 3/0414 345/174 |
| 2011/0279359 | A1* | 11/2011 | McCarty | G06F 8/38 345/156 |
| 2012/0226993 | A1* | 9/2012 | Bromer | G06F 3/011 715/744 |
| 2013/0216126 | A1* | 8/2013 | Chen | G06K 9/62 382/156 |
| 2013/0231755 | A1* | 9/2013 | Perek | G06F 1/1618 700/66 |
| 2014/0282051 | A1* | 9/2014 | Cruz-Hernandez | G06F 3/0414 715/744 |
| 2015/0086949 | A1* | 3/2015 | Li | G09B 5/00 434/236 |
| 2016/0239136 | A1* | 8/2016 | Kocak | G06F 3/0412 |

FOREIGN PATENT DOCUMENTS

WO      2016036443 A1      3/2016

\* cited by examiner

*Primary Examiner* — Ariel A Balaoing
(74) *Attorney, Agent, or Firm* — Zilka-Kotab, P.C.

(57) ABSTRACT

A computer-implemented method according to one embodiment includes identifying an amount of force applied to a pressure-sensitive touchscreen of a device, and providing the amount of force as an input to an application of the device.

10 Claims, 6 Drawing Sheets

PROVIDING FORCE INPUT TO AN APPLICATION

BACKGROUND

The present invention relates to capturing and interpreting user feedback, and more specifically, this invention relates to using a force applied to a touchscreen as input to an application.

Touchscreens are a popular feature of many current devices. For example, users may touch the screen of a device in order to interact with the device. However, data received from the touchscreen that is utilized by the device is currently limited to location data indicating a location where user contact was made with the touchscreen.

SUMMARY

A computer-implemented method according to one embodiment includes identifying an amount of force applied to a pressure-sensitive touchscreen of a device, and providing the amount of force as an input to an application of the device.

According to another embodiment, a computer program product for providing force input to an application of a device includes a computer readable storage medium having program instructions embodied therewith, where the computer readable storage medium is not a transitory signal per se, and where the program instructions are executable by a processor to cause the processor to perform a method comprising identifying an amount of force applied to a pressure-sensitive touchscreen of the device, utilizing the processor, and providing the amount of force as an input to the application of the device, utilizing the processor.

A system according to another embodiment includes a processor, and logic integrated with the processor, executable by the processor, or integrated with and executable by the processor, the logic being configured to identify an amount of force applied to a pressure-sensitive touchscreen of a device, and provide the amount of force as an input to an application of the device.

Other aspects and embodiments of the present invention will become apparent from the following detailed description, which, when taken in conjunction with the drawings, illustrate by way of example the principles of the invention.

DETAILED DESCRIPTION

The following description discloses several preferred embodiments of systems, methods and computer program products for providing force input to an application. Various embodiments provide a method to identify force applied to a force-sensitive touchscreen, and provide that identified force as input to an application.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for providing force input to an application.

In one general embodiment, a computer-implemented method includes identifying an amount of force applied to a pressure-sensitive touchscreen of a device, and providing the amount of force as an input to an application of the device.

In another general embodiment, a computer program product for providing force input to an application of a device includes a computer readable storage medium having program instructions embodied therewith, where the computer readable storage medium is not a transitory signal per se, and where the program instructions are executable by a processor to cause the processor to perform a method comprising identifying an amount of force applied to a pressure-sensitive touchscreen of the device, utilizing the processor, and providing the amount of force as an input to the application of the device, utilizing the processor.

In another general embodiment, a system includes a processor, and logic integrated with the processor, executable by the processor, or integrated with and executable by the processor, the logic being configured to identify an amount of force applied to a pressure-sensitive touchscreen of a device, and provide the amount of force as an input to an application of the device.

Figure 1:
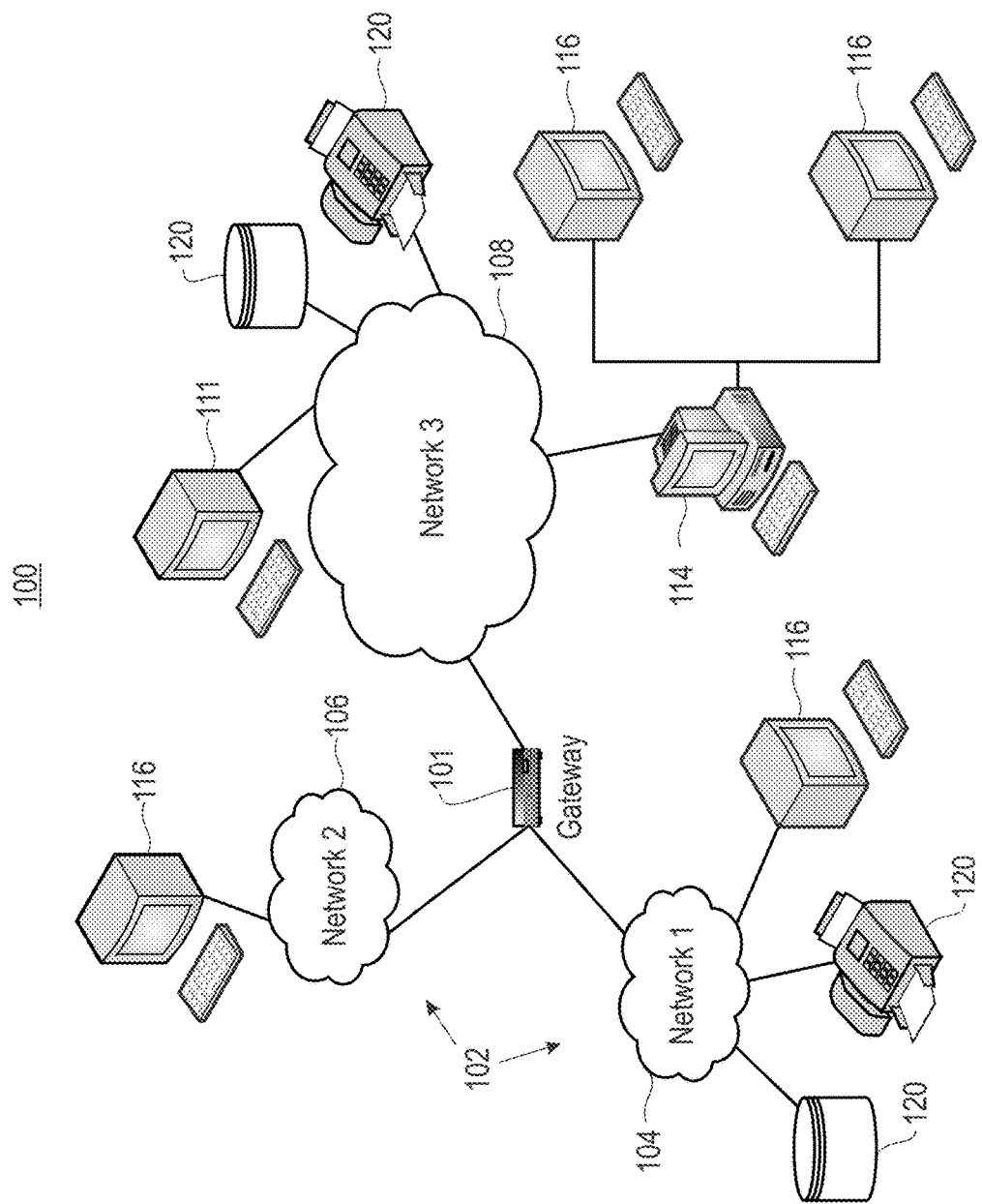
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
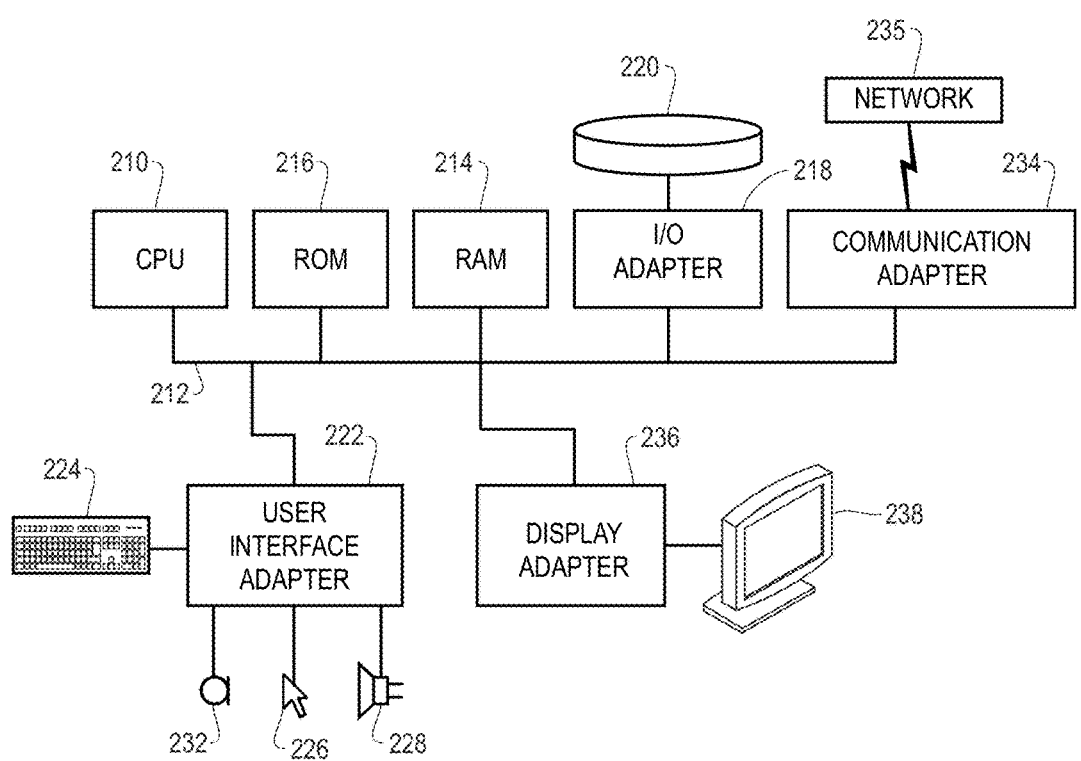
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
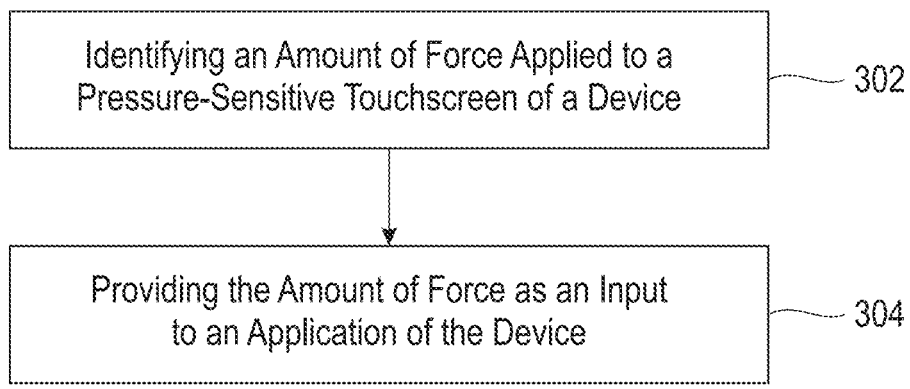
FIG. 3 illustrates a method for providing force input to an application, in accordance with one embodiment.

Now referring to FIG. 3, a flowchart of a method 300 is shown according to one embodiment. The method 300 may be performed in accordance with the present invention in any of the environments depicted in FIGS. 1-2 and 6, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where an amount of force applied to a pressure-sensitive touchscreen of a device is identified. In one embodiment, the amount of force may include an amount of pressure applied to the pressure-sensitive touchscreen. In one embodiment, the pressure sensitive touchscreen may include a display screen capable of receiving tactile input (e.g., from a user, etc.). In yet another embodiment, the pressure sensitive touchscreen may include one or more sensors integrated within or adjacent to the screen (e.g., pressure sensors, etc.) that detect an amount of force being applied to the pressure sensitive touchscreen.

For example, the one or more sensors may detect a pressure index measurement that indicates how hard a user is pushing on the pressure sensitive touchscreen. In another example, this measurement may be represented by a Z dimension measurement in addition to X and Y location dimension measurements that are obtained on the pressure sensitive touchscreen.

Additionally, in one embodiment, the device may include a mobile computing device, a computer monitor, etc. In another embodiment, the amount of force may be identified by an application. For example, the amount of force may be identified by an application running on the device. In another example, the amount of force may be received by the application from the one or more sensors of the pressure sensitive touchscreen.

Further, in one embodiment, the amount of force may be identified by hardware of the device (e.g., hardware integrated into the device, etc.). For example, the amount of force may be received by the hardware from the one or more sensors of the pressure sensitive touchscreen.

Further still, in one embodiment, the force may be applied by a user of the device. For example, the force may be applied to the pressure sensitive touchscreen in response to one or more actions performed by the device (e.g., the displaying by the device of one or more images or video, the sending or receiving of one or more messages by the device, etc.). In another embodiment, the force may be applied by the user tapping or touching one or more fingers, appendages, or objects (such as a stylus, etc.) on the surface of the pressure sensitive touchscreen.

Further, as shown in FIG. 3, method 300 may proceed with operation 304, where the amount of force is provided as an input to an application of the device. In one embodiment, a pressure index measurement determined for the amount of force may be compared to an emotional response index to determine a result, and this result may be translated into the input.

In another embodiment, the comparison and translation may be performed in real time (e.g., using one or more of hardware and software such as one or more applications, etc.). In still another embodiment, the application may perform the comparison and translation. In another embodiment, the application may include a program stored and/or run by the device. For example, the program may include a mobile application.

In addition, in one embodiment, the emotional response index may map an amount of force (e.g., a pressure index measurement) to one or more emotions (e.g., a level of frustration, etc.). In another embodiment, the emotional response index may be calibrated by a user.

For example, force from the user may be received at varying levels of intensity at the pressure-sensitive touchscreen in response to one or more prompts from the device, where each prompt is associated with a predetermined emotional state. In another example, a single amount of force may be received by the user at the pres sure-sensitive touchscreen, and this amount may be mapped out over a continuum (e.g., from a low amount of force to a great amount of force, etc.). In another embodiment, the device may also dynamically update the emotional response index over time in response to received user behavior.

Furthermore, in one embodiment, an emotion may be determined for the user, based on the comparison of the amount of force to the index. For example, a level of frustration may be determined for the user, based on the comparison. In another embodiment, the emotion may be provided to the application. For example, the emotion may be provided to the application as feedback data, as control data, etc.

Further still, in one embodiment, the application may provide output to the user, in response to the input. For example, the application may analyze the input and may perform one or more actions in response to the input. In another example, in response to the input, the application may request more information from the user (e.g., by presenting the user with a question such as "having problems with X?," etc.). In yet another example, the application may launch or close in response to the input.

Also, in one embodiment, the amount of force may be compared to a feedback index. For example, the feedback index may map force to one or more predetermined input parameters. For instance, an amount of force determined to be greater than a first predetermined threshold may be converted to a first parameter that is provided to the application, an amount of force determined to be greater than a second predetermined threshold may be converted to a second parameter that is provided to the application, etc.

In another example, a first amount of force may be translated to a "no" response that is provided to the application, a second amount of force greater than the first amount of force may be translated to a "yes" response that is provided to the application, etc. In this way, the amount of force may be used to communicate with one or more applications within the device in conjunction with or instead of voice and/or textual commands.

In one embodiment, users may have increased physiological responses due to frustrations in navigating user interfaces and/or operating technology. By detecting the input from a user using pressure/force metrics, interfaces and their respective designers may detect an emotional response from users and leverage this metric as user feedback to modify an existing design.

Figure 4:
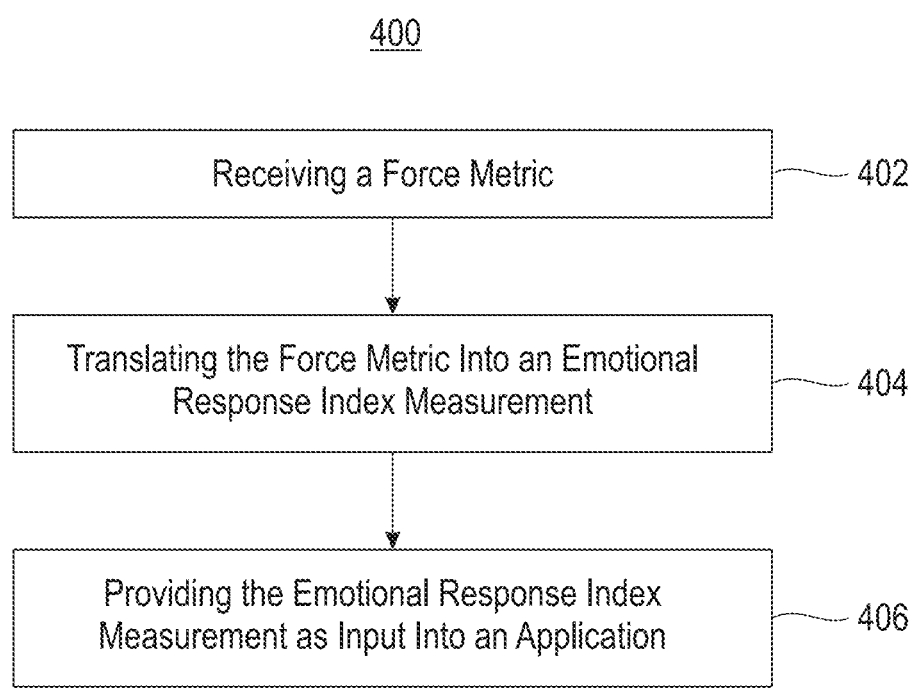
FIG. 4 illustrates a method for translating a force metric into an emotional response index measurement, in accordance with one embodiment.

Now referring to FIG. 4, a flowchart of a method 400 for translating a force metric into an emotional response index measurement is shown according to one embodiment. The method 400 may be performed in accordance with the present invention in any of the environments depicted in FIGS. 1-2 and 6, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a force metric is received. In one embodiment, the force metric may include a measurement on a pressure index indicating an amount of applied pressure. For example, the measurement on the pressure index may indicate an amount of pressure applied to a pressure-sensitive touchscreen. In another embodiment, the force metric may be received from one or more sensors associated with a pressure-sensitive touchscreen.

Additionally, as shown in FIG. 4, method 400 may proceed with operation 404, where the force metric is translated into an emotional response index measurement. In one embodiment, the force metric may be translated into the emotional response index measurement by comparing the force metric to a mapping. For example, the mapping may include a mapping of force metrics to values within an emotional response index. In another embodiment, the force metric is translated into an emotional response index measurement in real time (e.g., utilizing one or more of hardware and software, etc.).

Further, as shown in FIG. 4, method 400 may proceed with operation 406, where the emotional response index measurement is provided as input into an application. In this way, the force metric may be converted into contextual feedback that is provided to the application in response to one or more actions performed by the application.

In one embodiment, by leveraging the pressure used through a particular interaction flow through a given application on a touch-enabled user interface, a pressure and/or force metric may be mapped to an emotional response of difficulty of operation. A range of pressure/force values may be captured for a particular user and mapped to an emotional response index. A stronger pressure input may be mapped to this emotional response index in order to trigger a software dialog to capture contextual feedback from the user.

Figure 5:
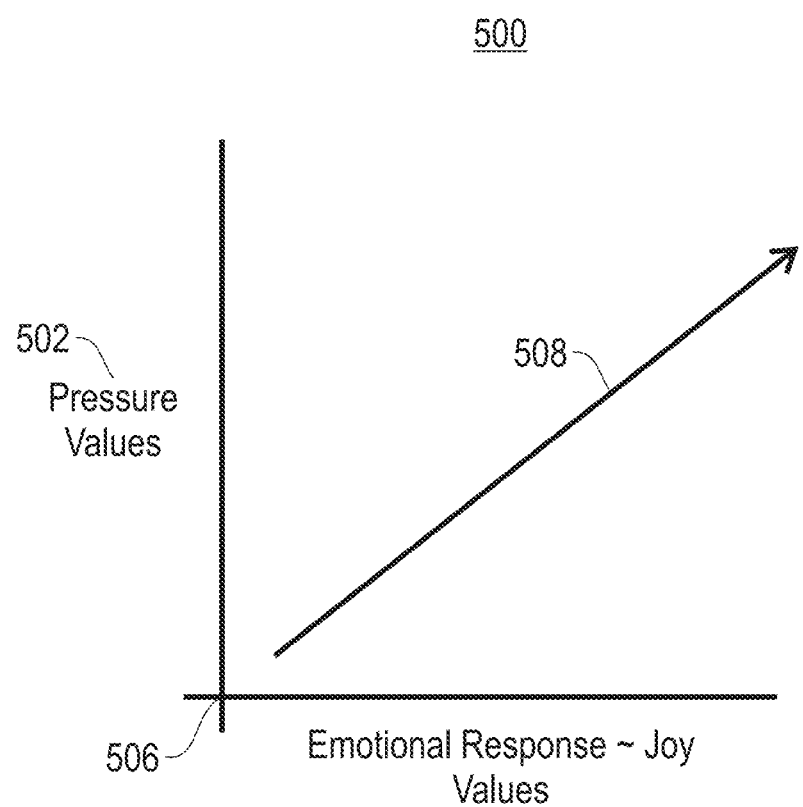
FIG. 5 illustrates a graph representing an exemplary mapping between pressure values and emotional response values, in accordance with one embodiment.

FIG. 5 illustrates a graph 500 representing an exemplary mapping 508 between pressure values 502 and emotional response values 504, according to one embodiment. In one embodiment, each of the pressure values 502 may represent an applied pressure that is received by one or more pressure sensors. In another embodiment, the pressure values 502 may increase in magnitude moving from the intersection 506 of the graph 500.

Additionally, in one embodiment, each of the emotional response values 504 may represent an emotional state for a user. For example, each of the emotional response values 504 may represent a level of frustration felt by the user. In another embodiment, the emotional response values 504 may increase in magnitude moving from the intersection 506 of the graph 500. For example, an increase in the magnitude of the emotional response values 504 may indicate an increasing level of frustration felt by the user.

Further, in one embodiment, the mapping 508 indicates which pressure values 502 correspond to which emotional response values 504. In this way, the mapping 508 may connect pressure to emotion, and an input pressure value may be compared to the exemplary mapping 508 in order to determine a corresponding output emotional response value.

Figure 6:
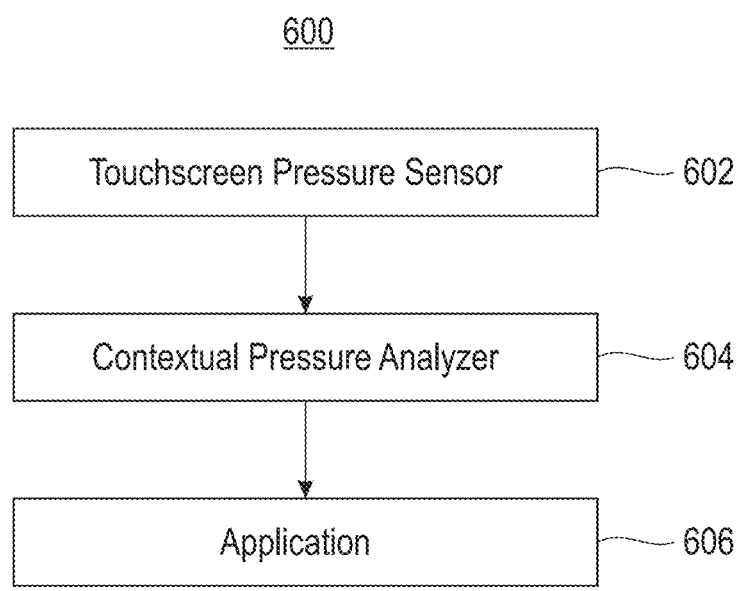
FIG. 6 illustrates an exemplary system for capturing contextual user input based on pressure input, in accordance with one embodiment.

FIG. 6 illustrates an exemplary system 600 for capturing contextual user input based on pressure input, according to one embodiment. As shown, the system 600 includes a touchscreen pressure sensor 602 in communication with a contextual pressure analyzer 604, where the contextual pressure analyzer 604 is in communication with an application 606. In one embodiment, the touchscreen pressure sensor 602 and contextual pressure analyzer 604 may each include one or more of hardware and software. In another embodiment, the application 606 may include software implemented within the exemplary system 600.

Additionally, in one embodiment, the exemplary system 600 may be included within a device such as a mobile device, a computing system including a touch-sensitive display, etc. In another embodiment, the contextual pressure analyzer 604 may be incorporated into the touchscreen pressure sensor 602.

Further, in one embodiment, the touchscreen pressure sensor 602 may output to the contextual pressure analyzer 604 a pressure value indicating an amount of pressure received by the touchscreen pressure sensor 602. Upon receiving the pressure value, the contextual pressure analyzer 604 may translate the pressure value into an emotional response value. For example, the contextual pressure analyzer 604 may compare the pressure value to a mapping between pressure values and emotional response values in order to translate the pressure value into an emotional response value.

Further still, in one embodiment, the contextual pressure analyzer 604 may then output the emotional response value to the application 606. In another embodiment, the application 606 may analyze the emotional response value and may perform one or more actions in response to the analysis.

In this way, pressure input that is received by the touchscreen pressure sensor 602 may be converted by the contextual pressure analyzer 604 into an emotional response value for analysis by the application 606. Additionally, a new pressure metric may be used to capture real-time analytics with respect to applications.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A computer-implemented method, comprising:
   calibrating a mapping of force metrics to emotional response values by receiving an amount of force from a user at varying levels of intensity at a pressure-sensitive touchscreen in response to one or more prompts from a device, and associating each prompt with a predetermined level of frustration felt by a user;
   identifying an amount of force applied to one or more pressure sensors of the pressure-sensitive touchscreen of the device, in response to a displaying of a video by the device;
   converting, in real time, the amount of force into a level of frustration felt by the user by comparing the amount of force to the mapping of the force metrics to the emotional response values, where:
      the force metrics include pressure values indicating an applied pressure received by the one or more pressure sensors,
      each of the emotional response values include the level of frustration felt by the user, and
      an increase of the applied pressure received by the one or more pressure sensors of the device indicates an increase in the level of frustration felt by the user within the mapping;
   providing the level of frustration felt by the user as an input to an application of the device;
   closing or launching the application of the device, in response to the level of frustration felt by the user; and
   dynamically updating the mapping over time in response to received user behavior.
2. The computer-implemented method of claim 1, wherein the amount of force applied to the one or more pressure sensors is identified in response to a sending or receiving of one or more messages by the device.
3. The computer-implemented method of claim 1, further comprising calibrating the mapping of force metrics to emotional response values by:
   receiving a single amount of force by the user at the pressure-sensitive touchscreen; and
   mapping the single amount of force over a continuum from a first amount of force to a second amount of force.
4. The computer-implemented method of claim 1, wherein the converting is performed in hardware in real time.

5. The computer-implemented method of claim 1, further comprising asking the user about one or more problems, in response to the level of frustration felt by the user.

6. A computer program product for providing force input to an application of a device, the computer program product comprising a computer readable storage medium having program instructions embodied therewith, wherein the computer readable storage medium is not a transitory signal per se, the program instructions executable by a processor to cause the processor to perform a method comprising:

calibrating a mapping of force metrics to emotional response values by receiving an amount of force from a user at varying levels of intensity at a pressure-sensitive touchscreen in response to one or more prompts from a device, and associating each prompt with a predetermined level of frustration felt by a user, utilizing the processor;

identifying an amount of force applied to one or more pressure sensors of the pressure-sensitive touchscreen of the device, in response to a displaying of a video by the device, utilizing the processor;

converting, utilizing the processor in real time, the amount of force into a level of frustration felt by the user by comparing the amount of force to the mapping of the force metrics to the emotional response values, where:

the force metrics include pressure values indicating an applied pressure received by the one or more pressure sensors, each of the emotional response values include the level of frustration felt by the user, an increase of the applied pressure received by the one or more pressure sensors of the device indicates an increase in the level of frustration felt by the user within the mapping; and providing the level of frustration felt by the user as an input to the application of the device, utilizing the processor;

closing or launching the application of the device, in response to the level of frustration felt by the user, utilizing the processor; and dynamically updating the mapping over time in response to received user behavior, utilizing the processor.

7. The computer program product of claim 6, wherein the amount of force applied to the one or more pressure sensors is identified in response to a sending or receiving of one or more messages by the device.

8. The computer program product of claim 6, further comprising calibrating the mapping of force metrics to emotional response values, utilizing the processor, by:

receiving a single amount of force by the user at the pressure-sensitive touchscreen; and mapping the single amount of force over a continuum from a first amount of force to a second amount of force.

9. The computer program product of claim 6, wherein the level of frustration felt by the user is associated with a difficulty of operation.

10. A system, comprising:

a processor; and logic integrated with the processor, executable by the processor, or integrated with and executable by the processor, the logic being configured to:

calibrate a mapping of force metrics to emotional response values by receiving an amount of force from a user at varying levels of intensity at a pressure-sensitive touchscreen in response to one or more prompts from a device, and associating each prompt with a predetermined level of frustration felt by a user;

identify an amount of force applied to one or more pressure sensors of the pressure-sensitive touchscreen of the device, in response to a displaying of a video by the device;

convert, in real time, the amount of force into a level of frustration felt by the user by comparing the amount of force to the mapping of the force metrics to the emotional response values, where:

the force metrics include pressure values indicating an applied pressure received by the one or more pressure sensors, each of the emotional response values include the level of frustration felt by the user, and an increase of the applied pressure received by the one or more pressure sensors of the device indicates an increase in the level of frustration felt by the user within the mapping;

provide the level of frustration felt by the user as an input to an application of the device;

close or launch the application of the device, in response to the level of frustration felt by the user; and dynamically update the mapping over time in response to received user behavior.

* * * * *